United States Patent
Zanella et al.

(10) Patent No.: US 7,764,159 B2
(45) Date of Patent: Jul. 27, 2010

(54) SHAPE-MEMORY ACTUATOR DEVICE WITH PROTECTION AGAINST OVER-STRESSES

(75) Inventors: Alessandro Zanella, Turin (IT); Stefano Alacqua, Rivoli Cascine Vica (IT); Francesco Butera, Turin (IT)

(73) Assignee: C.R.F. Societá Consortile per Azioni, Orbassano (Torino) (IT)

( * ) Notice: Subject to any disclaimer, the term of this patent is extended or adjusted under 35 U.S.C. 154(b) by 1267 days.

(21) Appl. No.: 11/294,570

(22) Filed: Dec. 6, 2005

(65) Prior Publication Data
US 2006/0148296 A1 Jul. 6, 2006

(30) Foreign Application Priority Data
Dec. 30, 2004 (EP) .................................. 04425963

(51) Int. Cl.
*H01H 87/00* (2006.01)
*H01R 13/62* (2006.01)
*F01B 29/10* (2006.01)

(52) U.S. Cl. .................. 337/140; 337/139; 337/382; 337/393; 337/394; 337/395

(58) Field of Classification Search ............ 337/14, 337/139, 140, 382, 393–395
See application file for complete search history.

(56) References Cited

U.S. PATENT DOCUMENTS

| 6,732,516 B2 * | 5/2004 | Butera et al. ............... 60/527 |
| 7,073,332 B2 * | 7/2006 | Butera et al. ............... 60/527 |
| 7,086,885 B2 * | 8/2006 | Alacqua ................. 439/266 |
| 7,585,006 B2 * | 9/2009 | Alacqua et al. ........ 292/341.16 |
| 2002/0130754 A1 * | 9/2002 | Alacqua et al. ............ 337/118 |
| 2002/0149947 A1 * | 10/2002 | Butera et al. ............. 362/513 |
| 2004/0104580 A1 * | 6/2004 | Spiessl et al. ............. 292/84 |
| 2005/0195064 A1 * | 9/2005 | Biasiotto et al. ........... 337/140 |
| 2007/0215445 A1 * | 9/2007 | Alacqua et al. .......... 200/17 R |
| 2009/0009026 A1 * | 1/2009 | Biasiotto et al. ........... 310/306 |

FOREIGN PATENT DOCUMENTS

| EP | 1 340 870 | 2/2002 |
| EP | 1 245 762 | 10/2002 |
| EP | 1 279 784 | 1/2003 |
| EP | 1 443 227 | 8/2004 |
| EP | 1 598 568 | 11/2005 |
| WO | WO 03/003137 | 1/2003 |

* cited by examiner

*Primary Examiner*—Anatoly Vortman
(74) *Attorney, Agent, or Firm*—Nixon & Vanderhye P.C.

(57) ABSTRACT

A shape-memory actuator device comprises means for interrupting electrical supply to a shape-memory element when the axial load applied to said element exceeds a predetermined threshold value.

15 Claims, 4 Drawing Sheets

SHAPE-MEMORY ACTUATOR DEVICE WITH PROTECTION AGAINST OVER-STRESSES

BACKGROUND OF THE INVENTION

The present invention relates to shape-memory actuator devices, of the type comprising an elongated element, in the form of a cable or rod, having one end connected to a controlled member, in which:

at least one portion of the elongated element is constituted by a shape-memory material, which is able to undergo a variation in shape following upon its heating, for the purpose of controlling the controlled member, and there is provided an electric-supply circuit to cause the elongated shape-memory element to be traversed by electric current for the purpose of bringing about its heating.

A shape-memory actuator device of the type referred to above has been proposed by the present applicant in the document No. WO 03/003137 A1. Improvements to said device have formed the subject of the European patent application No. EP-A-1 443 227 and of the European patent application No. 04425373.0, both filed in the name of the present applicant (the latter still secret at the date of filing of the present patent application).

SUMMARY OF THE INVENTION

With a view to improving further the previously proposed devices, the subject of the present invention is a shape-memory actuator device having all the characteristics that have been indicated above and is moreover characterized in that the aforesaid device comprises sensor means for detecting overstepping of a pre-set threshold value of the axial load applied to the shape-memory element during its activation.

According to a further characteristic, the aforesaid sensor means comprise an axially compliant element, operatively set between said end of the elongated shape-memory element and the controlled member, said compliant element being designed to yield axially upon overstepping of said threshold value of the axial load, so as not to transmit the movement of said end of the elongated shape-memory element to said controlled member when the load applied thereto exceeds said predetermined threshold value.

According to a further preferred characteristic, the aforesaid compliant element is a spring, preferably a helical spring, set axially between a first body connected to said end of the shape-memory element and a second body connected operatively to the controlled member.

In the preferred embodiment, the actuator device moreover comprises means for interrupting the electrical supply to the shape-memory element when said sensor means detect an overstepping of said threshold value of the axial load of the shape-memory element. Said means for interrupting the electrical supply preferably comprise an electrical contact interposed in the supply circuit and constituted by contact elements that move away from one another when said compliant element yields upon overstepping of the aforesaid threshold value of the axial load.

Once again in the case of the aforesaid preferred embodiment, a first contact element of said electrical contact is carried by a first body connected to said end of the shape-memory element, the second contact element being carried by a second body connected operatively to the controlled member, so that, upon yielding of said compliant element during activation of the shape-memory element, the first body is displaced with respect to the second body, causing opening of the aforesaid electrical contact.

According to a further preferred characteristic, there are moreover envisaged means for the regulation of the load of the aforesaid spring, for the purpose of enabling a regulation of the threshold value, at which the device for interruption of the electrical supply to the shape-memory element trips. The latter can be constituted by a single shape-memory wire, or else also by a plurality of elongated elements, for example a plurality of shape-memory wires, arranged parallel to one another.

BRIEF DESCRIPTION OF THE DRAWINGS

Further characteristics and advantages of the invention will emerge from the ensuing description with reference to the annexed plate of drawings, which are provided purely by way of non-limiting example and in which.

DETAILED DESCRIPTION OF THE INVENTION

Figures 1, 2:
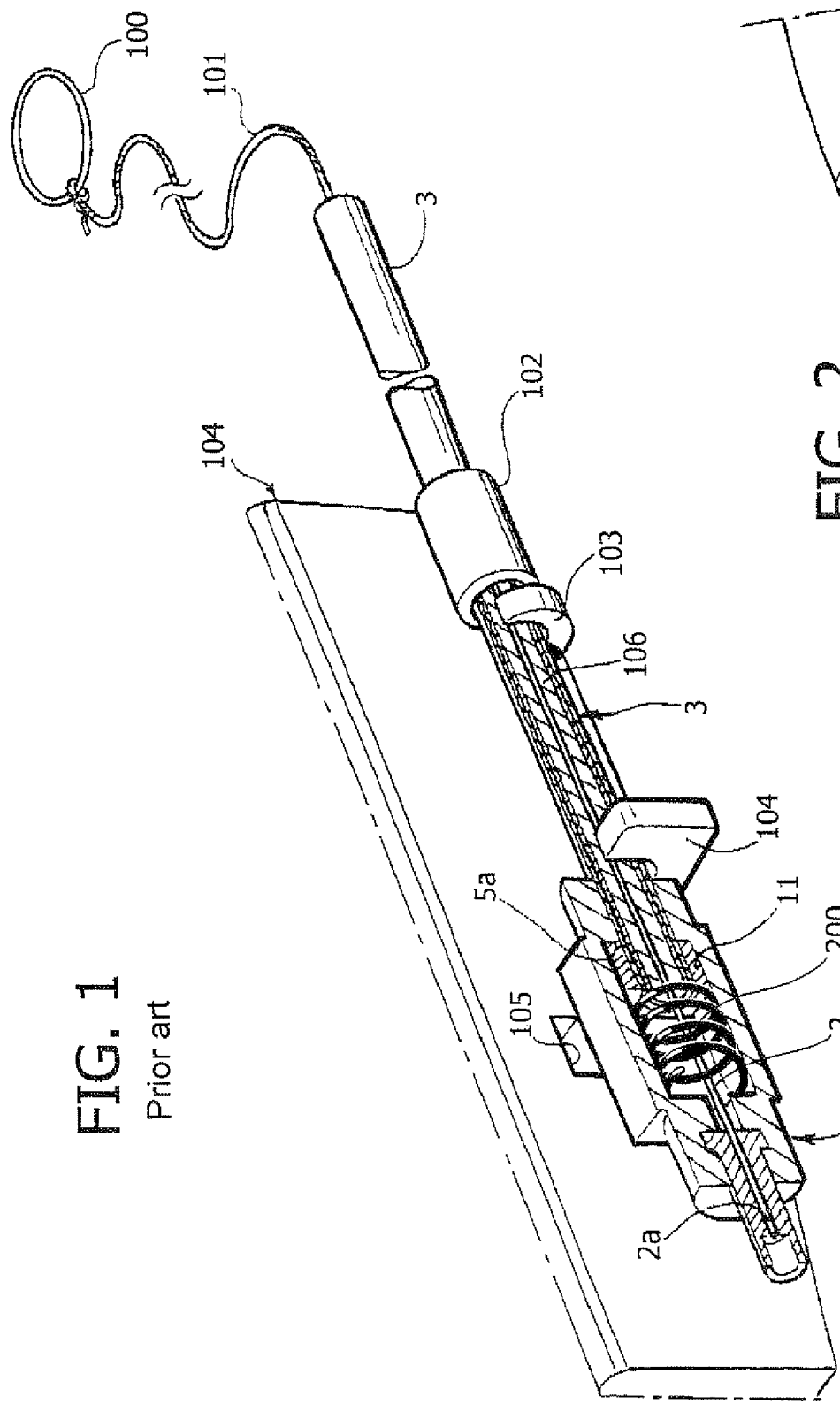
FIG. 1 is a partially sectioned perspective view of an embodiment of the actuator device previously proposed by the present applicant, corresponding substantially to FIG. 5 of the international patent application No. WO03/003137.
FIG. 2 is a partially sectioned perspective view of the shape-memory cable forming part of the actuator, according to the solution already proposed in the European patent application No. EP-A-1 443 227.

With reference to FIG. 1, illustrated therein is an example of application of the previously proposed actuator to the control of the lock of the hatchback door or rear boot of a motor vehicle.

There are contemplated standards that force the manufacturer to envisage the possibility of operating the lock manually from inside the vehicle in order to enable a person who were to remain accidentally closed inside the motor vehicle to open the hatch-back door. In the example illustrated, the actuator can be operated manually by means of a ring 100, which is connected via a ring 101 to the sheath 3 of a flexible-cable actuator device. On the sheath 3 is secured a bushing 102, designed to bear upon a fixed detent 103 forming part of the structure 104 of the device of the lock of the hatch-back door. The co-operating action of the bushing 102 fixed to the sheath 3 and of the detent 103 prevents displacement of the sheath 3 in a direction opposite to that of actuation. Within the sheath 3 is set a flexible cable 2 made of shape-memory material (of course, it is also possible to provide the device with a rigid cable instead of a flexible cable), which is secured at one end 2a to a cylindrical body 5, which is in turn connected, through a slit 105 made in the wall of the shell of the lock 104, to the controlled member of the lock (not illustrated). There are moreover provided means of electrical supply (not illustrated) for applying an electrical pressure to the two opposite ends of the shape-memory cable 2 for the purpose of causing it to shorten. When the actuator is operated manually by acting on the ring 100, the mechanical attraction is transmitted through the sheath 3, which is set towards the right as viewed in FIG. 1, so causing a moving away of the bushing 102 from the fixed detent 103. The displacement of the sheath 3 causes a corresponding displacement of the cylindrical body 5, in so far as anchored to the end of the sheath 3 is a ring 11, which bears upon an end surface 5a of an internal cavity of the cylindrical body 5. The displacement of the latter consequently causes an actuation of the controlled member, which, as already mentioned, is connected to the cylindrical body 5 by means of a connection passing through the slit 105.

In the case, instead, of electrical actuation, the sheath 3 remains stationary, since it cannot be displaced towards the left following upon the engagement of the bushing 102 against the fixed detent 103, whilst the shape-memory cable 2 is shortened, so causing a sliding of the cylinder 5 on the sheath 3 (so that the ring 11 moves away from the contrast surface 5a, overcoming the action of a spring 200) and again an actuation of the controlled member.

The advantage of using the sheath of the actuator device as element of mechanical transmission in the case of manual actuation consists in the fact that in this way it is always possible to guarantee operation of the device even in the case of accidental failure of the flexible shape-memory cable.

It may be noted that in the case of the solution previously proposed (illustrated in FIG. 1), between the cable 2 and the sheath 3 is interposed a spacing layer 106 made of synthetic material that is joined to the sheath 3 and is fixed thereto. Said layer has only a spacing function, so that during operation of the device, there is created a relative movement of the flexible cable with respect thereto.

In the case of the solution, which has also already been proposed (illustrated in FIG. 2), instead, associated to the flexible cable is a structure of a different type. Also in this case, between the flexible cable 2 made of shape-memory material and the corresponding flexible sheath 3 is provided a spacing layer 106, which in the case illustrated is constituted by a metallic sheath. The difference with respect to the solution illustrated in FIG. 1 lies in the fact that in this case on the cable made of shape-memory material 2 is moulded a coating layer 110, which adheres to the shape-memory cable 2 and is chosen from an elastomer-silicone material or synthetic material such as to favour both cooling of the cable 2 after passage of the current has ceased and return of the cable 2 into its resting configuration as a result of the elastic return of the coating 110.

The coating 110, which is adherent to the cable 2, performs the function of a spring distributed longitudinally, which is subject to compression when the cable 2 is shortened following upon its activation and consequently favours return of the cable into the resting position on account of its elastic return.

The configuration of the shape-memory cable can be any whatsoever. It is moreover possible to extrude a number of shape-memory cables within the same coating, arranged parallel to one another. Likewise possible is a U-shaped cable configuration, with an ascending branch and a descending branch, and the two ends of the cable adjacent to one another, which, among other things, enables the advantage of a convenient electrical connection of the cable to the electrical-supply means.

Figure 3:
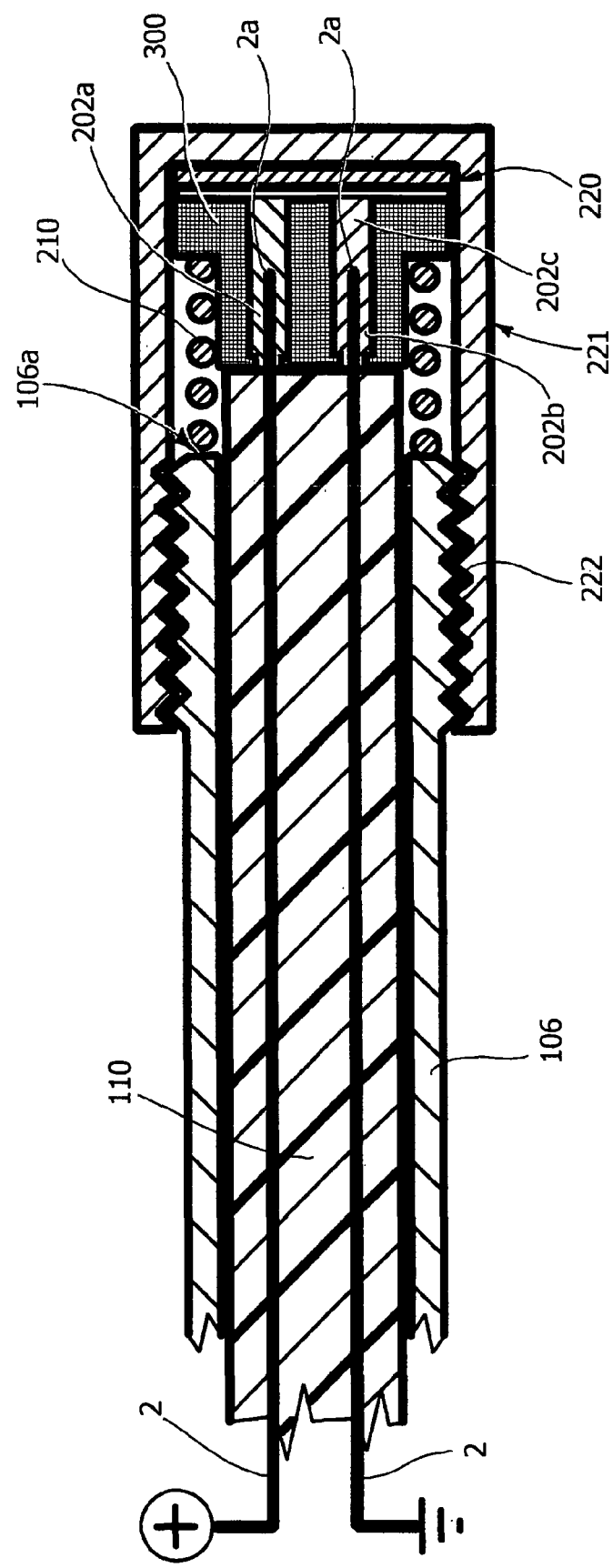
FIGS. 3 and 4 illustrate a detail of the actuator device according to the present invention in two different operating conditions.
Figure 4:
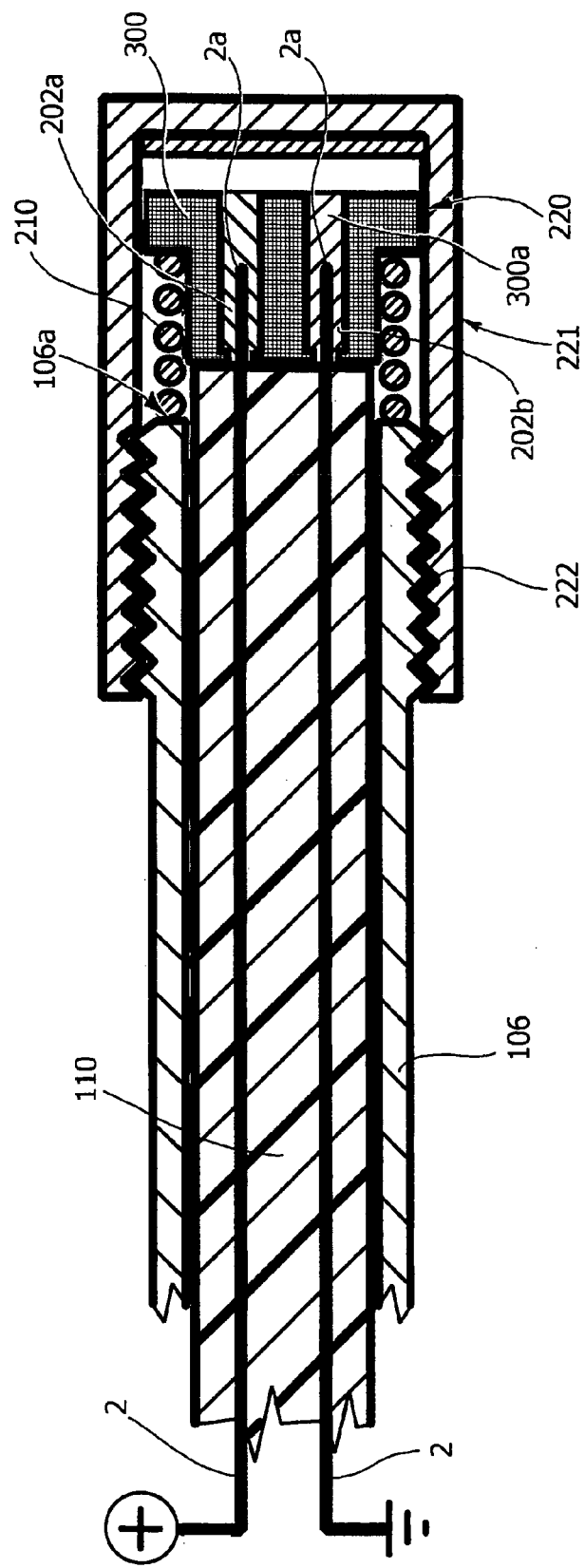

In FIGS. 3 and 4, the parts in common to the ones of FIGS. 1 and 2 are designated with the same reference numbers. Said Figures illustrate, at an enlarged scale, the detail of the actuator adjacent to the end 2a of the shape-memory cable. In the example illustrated in FIGS. 3 and 4 there are in fact envisaged two shape-memory wires 2 arranged parallel to one another, embedded in an elasto-silicone sheath 110 and having the respective ends 2a secured to two metal bodies 202a, 202b, the ends of which surface from a bushing of electrically insulating material 300, in which the metal bodies 202a, 202b are embedded. The insulating bushing 300 has an end flange 300a. The elasto-silicone sheath may be displaced within a tubular metal guide 106 that has an end surface 106a. Set axially between the end surface 106a and the flange 300a of the insulating bushing 300 is a compliant safety element 210 preferably in the form of a helical spring. The ends of the two wires 2 that are remote from the ends 2a are respectively connected to the two ends of the electrical-supply circuit. The circuit closes through the contact of the two contact elements 202a, 202b with a contact element 220 carried by the bottom wall of a cup-like element 221, which is secured in an axially adjustable position (by means of a threaded or knurled coupling 222) to the metal guide 106. The possibility of adjusting the axial position of the cup-like element 221 with respect to the metal guide 106 enables the load of the safety element 210 to be adjusted accordingly. The cup-like element 221 is operatively connected to the controlled member.

Operation of the device is described in what follows. When the electrical supply is activated, the two stretches of shape-memory wire 2 are contracted, causing a displacement towards the left (as viewed in the drawings) of the contacts 202a, 202b. If the applied load remains smaller than the corresponding threshold value upon yielding of the elastic element 210, the elastic element 210 remains undeformed and transmits the movement of the half-bushings to the cup-like element 221 and thereby to the controlled element. If the axial load to which the shape-memory wires 2 are subjected following upon their activation exceeds the predetermined threshold value mentioned above, the elastic element 210 yields, so that the contacts 202a, 202b displace towards the left (FIG. 4), without transmitting a corresponding movement to the cup-like element 221. Said relative movement causes a moving away of the two contact elements 202a, 202b from the contact element 220 with the consequent interruption of the electrical supply.

Thanks to the aforesaid arrangement, there is consequently obtained a protection of the shape-memory actuator device against excessive mechanical stresses and against an excessive electrical supply. The interruption of the electrical supply causes the return of the shape-memory element into its resting condition.

Figure 5:
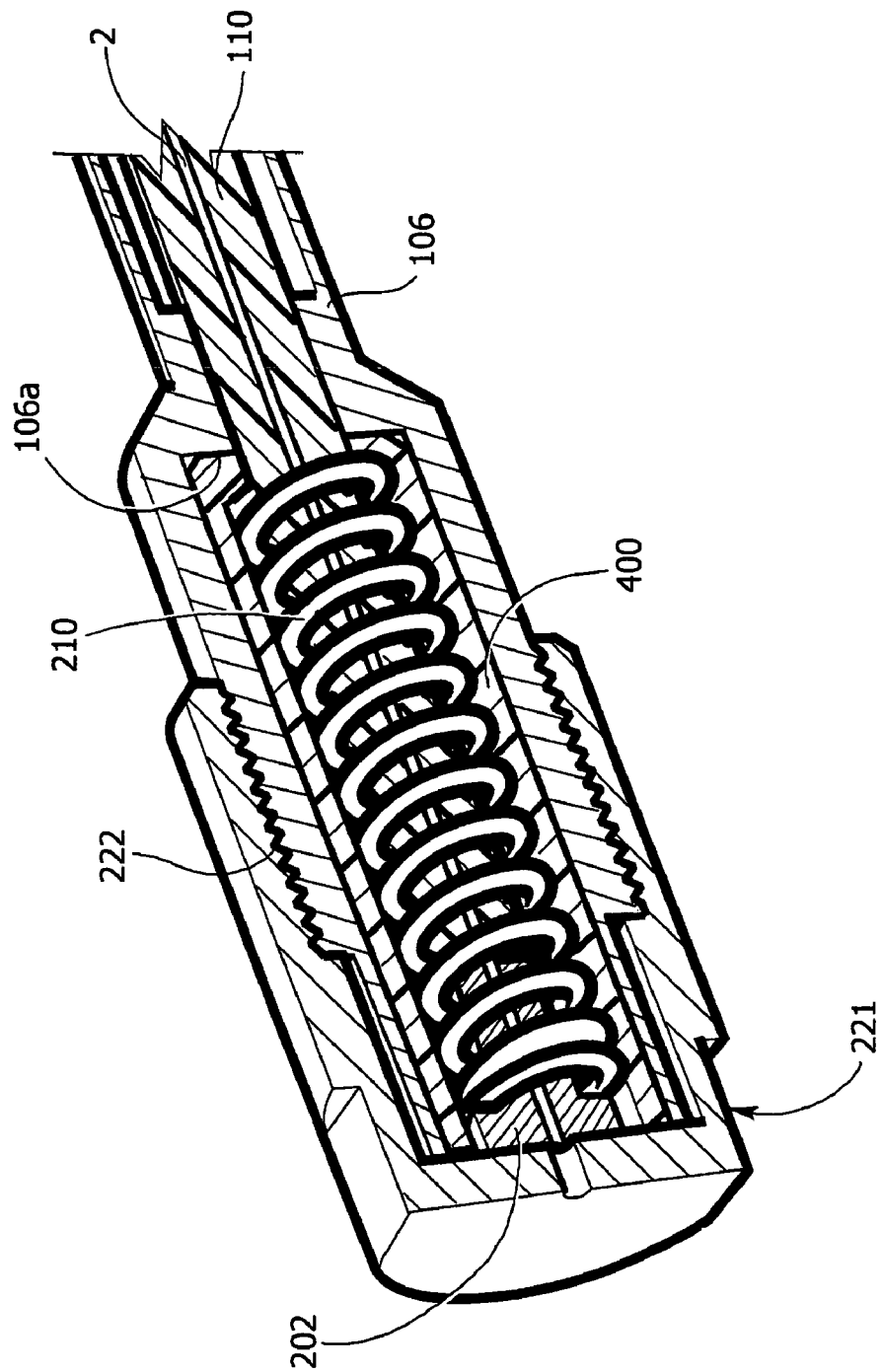
FIG. 5 is a perspective view of a variant of the detail of FIG. 4.

FIG. 5 shows a variant, which envisages a single shape-memory wire 2. In said figure and in FIGS. 3 and 4, corresponding parts have the same reference numbers. In the case of said variant, the single wire 2 has a metallic end 202 fixed to its end, which is in electrical contact with the bottom part of the element 221. When the spring 210 is undeformed, the electric current traverses the wire 2 up to the end 202, and thence passes through the element 221 and the body of the sheath 106, which is metallic, to return to the other end of electrical supply. It is also possible to adopt a sheath 106 made of synthetic material, but provided with a metal path for closing the electrical circuit. The same applies to the cup-like element 221. An insulating bushing 400 is radially set between the spring 210 and the metal end 202 (set therein) and the sheath 106 (set on the outside).

Of course, without prejudice to the principle of the invention, the details of construction and the embodiments may vary widely with respect to what is described and illustrated herein purely by way of example, without thereby departing from the scope of the present invention.

What is claimed is:

1. An actuator device comprising an elongated element, in the form of a cable or rod, having one end connected to a controlled member, in which:
    at least one portion of the elongated element is constituted by a shape-memory material, which can undergo a variation in shape upon heating, for the purpose of controlling the controlled member; and there is provided an electrical-supply circuit to cause the elongated element to be traversed by an electric current to bring about its heating, and wherein said device comprises a sensor means for detecting an overstepping of a predetermined threshold value of the axial load applied to the elongated element during its activation.

2. The actuator device according to claim 1, wherein said sensor means comprise an axially compliant element, operatively set between said end of the elongated element and the controlled member, said compliant element being designed to yield axially upon overstepping of said threshold value of the axial load, so as not to transmit the movement of said end of the elongated element to said controlled member when the load applied thereto exceeds said predetermined threshold value.

3. The actuator device according to claim 2, wherein said compliant element is a spring.

4. The actuator device according to claim 3, wherein said compliant element is a helical spring set axially between a first body connected to said end of the elongated element and a second body connected operatively to the controlled member.

5. The actuator device according to claim 2, wherein said device further comprises means for interrupting the electrical supply to the elongated element when said sensor means detect an overstepping of said threshold value of the axial load of the elongated element.

6. The actuator device according to claim 5, wherein said means for interrupting the electrical supply comprise an electrical contact interposed in the supply circuit and constituted by two contact elements, which move away from one another when said compliant element yields upon overstepping of the aforesaid threshold value of the axial load.

7. The actuator device according to claim 6, wherein a first contact element of said electrical contact is constituted by a first body connected to said end of the elongated element, the second contact element being carried by a second body operatively connected to the controlled member, so that upon yielding of said compliant element during activation of the elongated element the first body is displaced with respect to the second body, causing opening of the electrical contact.

8. The actuator device according to claim 7, wherein said elongate element is set within a tubular guide having an end surface, and in that said compliant element is operatively set between said end surface of the tubular guide.

9. The actuator device according to claim 8, wherein said second contact element is carried by a bottom wall facing said first contact element and forming part of a member connected to said tubular guide in an adjustable position.

10. The actuator device according to claim 3, wherein there are envisaged means for regulation of the load of the spring.

11. The actuator device according to claim 1, wherein said elongated element comprises one or more shape-memory wires arranged in parallel.

12. An actuator device comprising an elongated element, in the form of a cable or rod, having one end connected to a controlled member, in which:

at least one portion of the elongated element is constituted by a shape-memory material, which can undergo a variation in shape upon heating, for the purpose of controlling the controlled member; and there is provided an electrical-supply circuit to cause the elongated element to be traversed by an electric current to bring about its heating, wherein said device comprises a sensor means for detecting an overstepping of a predetermined threshold value of the axial load applied to the elongated element during its activation, wherein said sensor means comprise an axially compliant element, operatively set between said end of the elongated element and the controlled member, said compliant element being designed to yield axially upon overstepping of said threshold value of the axial load, so as not to transmit the movement of said end of the elongated element to said controlled member when the load applied thereto exceeds said predetermined threshold value, wherein said device further comprises means for interrupting the electrical supply to the elongated element when said sensor means detect an overstepping of said threshold value of the axial load of the elongated element, and wherein said means for interrupting the electrical supply comprise an electrical contact interposed in the supply circuit and constituted by two contact elements, which move away from one another when said compliant element yields upon overstepping of the aforesaid threshold value of the axial load.

13. The actuator device according to claim 12, wherein a first contact element of said electrical contact is constituted by a first body connected to said end of the elongated element, the second contact element being carried by a second body operatively connected to the controlled member, so that upon yielding of said compliant element during activation of the elongated element the first body is displaced with respect to the second body, causing opening of the electrical contact.

14. The actuator device according to claim 13, wherein said elongated element is set within a tubular guide having an end surface, and in that said compliant element is operatively set between said end surface of the tubular guide.

15. The actuator device according to claim 14, wherein said second contact element is carried by a bottom wall facing said first contact element and forming part of a member connected to said tubular guide in an adjustable position.

* * * * *